United States Patent
Anderson et al.

(10) Patent No.: US 10,112,349 B2
(45) Date of Patent: Oct. 30, 2018

(54) PLACEMENT OF PREPREG TOWS IN HIGH ANGLE TRANSITION REGIONS

(71) Applicant: The Boeing Company, Chicago, IL (US)

(72) Inventors: Donald A. Anderson, Bellevue, WA (US); Jessica R. Hughes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 878 days.

(21) Appl. No.: 14/220,725

(22) Filed: Mar. 20, 2014

(65) Prior Publication Data

US 2016/0176122 A1 Jun. 23, 2016

(51) Int. Cl.
| | | |
|---|---|---|
| *B29C 53/00* | (2006.01) | |
| *B29C 70/38* | (2006.01) | |
| *B29C 70/30* | (2006.01) | |
| *B29K 105/08* | (2006.01) | |

(52) U.S. Cl.
CPC ............ *B29C 70/382* (2013.01); *B29C 70/30* (2013.01); *B29C 70/38* (2013.01); *B29K 2105/0872* (2013.01); *Y02T 50/433* (2013.01)

(58) Field of Classification Search
CPC ....... B29C 70/382; B29C 70/30; B29C 70/38; B29C 70/386; B29C 70/388; B29C 70/50
See application file for complete search history.

(56) References Cited

U.S. PATENT DOCUMENTS

| | | | |
|---|---|---|---|
| 4,119,749 A * | 10/1978 | Roth | B32B 3/28 296/210 |
| 7,703,495 B2 | 4/2010 | Hoffman | |
| 2009/0263618 A1 | 10/2009 | McCarville et al. | |
| 2010/0143650 A1* | 6/2010 | Tsai | B29C 66/304 428/139 |
| 2012/0012242 A1 | 1/2012 | Blonigen et al. | |
| 2012/0076973 A1 | 3/2012 | Guzman et al. | |
| 2012/0323538 A1* | 12/2012 | Rassaian | G06F 17/5018 703/2 |
| 2013/0129526 A1* | 5/2013 | Williams | B29C 70/88 416/244 R |

FOREIGN PATENT DOCUMENTS

| | | |
|---|---|---|
| CN | 1665676 A | 9/2005 |
| CN | 102407937 A | 4/2012 |
| CN | 102529115 A | 7/2012 |
| CN | 103402739 A | 11/2013 |

(Continued)

OTHER PUBLICATIONS

Extended European Search Report, dated Jul. 24, 2015, regarding application No. EP15159797.8, 6 pages.

(Continued)

*Primary Examiner* — Stella K Yi
(74) *Attorney, Agent, or Firm* — Yee & Associates, P.C.

(57) ABSTRACT

Prepreg tows are placed on a substrate having a bend with a curvature extending over a transition region in the substrate. The tows are steered and laid on the substrate in at least a first section and a second section within the transition region, wherein each of the first and second sections has an angular orientation that is less than the curvature of the bend in order to reduce gathering of the tows.

15 Claims, 9 Drawing Sheets

(56) References Cited

FOREIGN PATENT DOCUMENTS

EP          2248659 A1    11/2010
GB          2492594 A     1/2013

OTHER PUBLICATIONS

Canadian Search Report, dated Nov. 16, 2016, regarding application No. 2878541, 3 pages.
State Intellectual Property Office of China, First Notification of Office Action, Search Report, and English Translation, dated May 4, 2018, regarding Application No. 201510079444.3, 15 pages.

\* cited by examiner

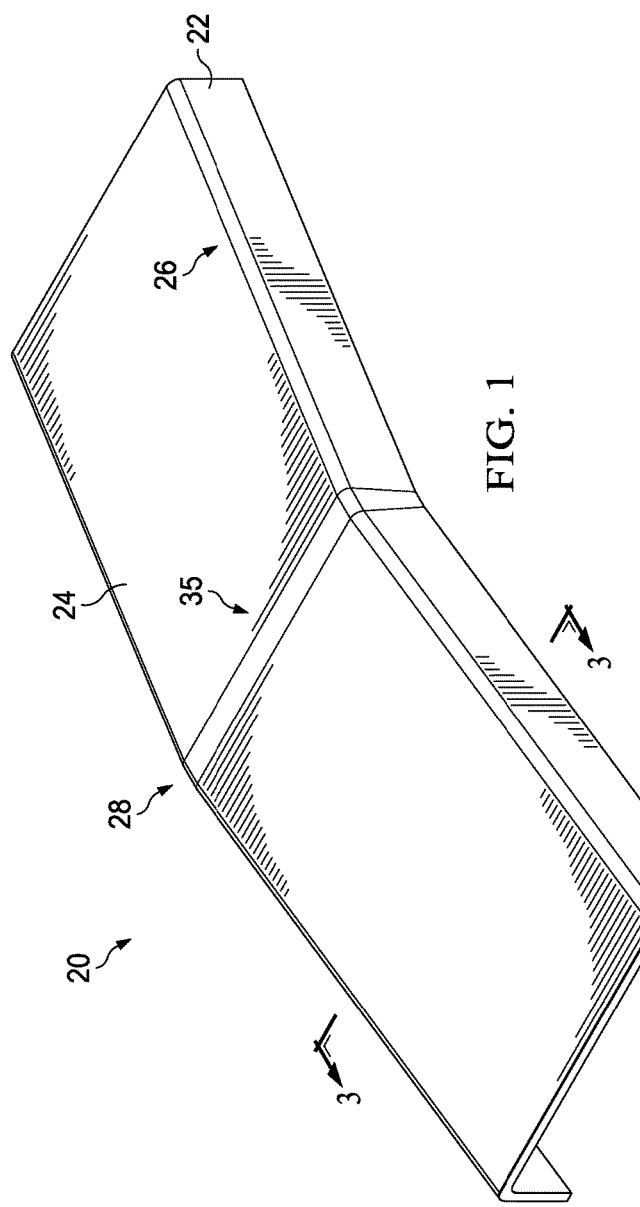
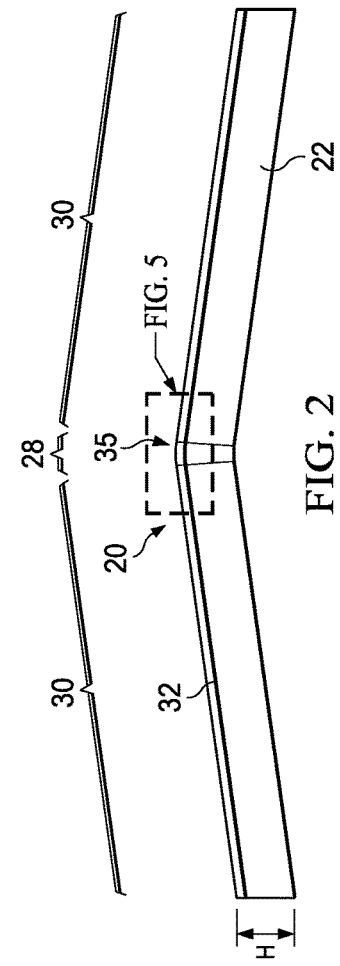

PLACEMENT OF PREPREG TOWS IN HIGH ANGLE TRANSITION REGIONS

BACKGROUND INFORMATION

1. Field

The present disclosure generally relates to the fabrication of composite laminate structures, and deals more particularly with automated placement of prepreg tows in high angle transition regions of a structure.

2. Background

Numeric computer controlled advanced fiber placement (AFP) machines may be used to layup large-scale, complex-shaped composite laminate structures. For example, in the aircraft industry, AFP machines may be used to layup composite airframe components such as spars and stringers. These AFP machines typically have one or more material placement heads that may be manipulated to apply and compact multiple prepreg tows on a mandrel or similar tool. Each tow comprises a formed tow prepreg or narrow strip cut from unidirectional tape which includes a bundle of fibers pre-impregnated with resin. In order to form nonlinear features or details of a structure, the material placement head is sometimes programmed to follow constant radius paths.

Automated layup of composite structures as discussed above can be challenging where the structure is highly contoured or has sharp geometrical features. For example, limitations on machine programming and/or material placement head movement may prevent layup of material around relatively sharp corners or highly angled bends, hereinafter referred to as "high angle transition regions" or "transition regions". Material characteristics such as, without limitation, material width, tack and fiber stiffness may also limit material placement in high angle transition regions. Another problem that may be encountered when laying tows in high angle transition regions is wrinkling, buckling and/or distortion of the tows. Steering the tows around sharp, constant radius paths in these transition regions causes the inside radius of the tows to be placed in compression. This inside radius compression may force the fibers of the tow to gather, resulting in wrinkles, buckles and/or fiber distortion that may have an undesired effect on the mechanical performance of the structure.

Tow gathering in high angle transition regions may be reduced to some degree by using narrower tows, however the use of narrower tows reduces the rate at which material can be laid, thus reducing production efficiency, and may not be practical in some applications. Employing narrow tows may require the use of compensating reinforcements such as additional plies because narrow tows may cause undesired knockdown in some mechanical properties of a structure. These compensating reinforcements add undesired weight to the structure and may increase manufacturing costs.

In order to overcome the problem of material gathering when wider tows are used, and/or limitations on the movement of material placement heads, composite laminate structures having high angle transition regions are currently produced using a multi-step process in which a joint containing the high angle transition region is separately fabricated and then joined to straight sections of the structure. This solution to the problem is time-consuming, labor intensive and requires multiple, complex and expensive tools. Moreover, use of a separately fabricated joint may require the use of additional reinforcements in order to achieve structural performance requirements.

Accordingly, there is a need for a method of placing composite material in high angle transition regions which permits formation of complex geometrical features or details of a structure and which reduces or eliminates material wrinkling, bucking and/or fiber distortion, while permitting fabrication of the structure as a single component. There is also a need for a method of automated placement of prepreg tows within high angle regions and sharp corners or highly angled bends that is not limited by AFP machine programming capabilities and/or AFP material application head movements. Further, there is a need for a method of fabricating composite laminate structures having high angle transition regions that obviates the need for separately fabricated joints and multiple tools.

SUMMARY

The disclosed embodiments provide a method of placing prepreg tows in high angle transition regions on a substrate during automated layup of composite laminate structures. The method substantially reduces or eliminates wrinkling, buckling and/or fiber distortion of the tows in the high angle transition regions. The reduction or elimination of tow wrinkling may reduce or eliminate localized stresses in a laminate, which may lead to improved performance of the structure. Complex and/or difficult-to-form geometric features such as sharp bends of a structure may be laid up, which may otherwise not be possible because of limitations on AFP machine programming and/or material placement head movements, and/or material properties. The disclosed method may allow the use of wider tows in order to increase the material application rate, and thus may increase production efficiency. A composite laminate structure having high angle transition regions may be fabricated as a single component, rather than multiple components which require multiple assembly tools.

According to one disclosed embodiment, a method is provided of placing a prepreg tow on a substrate having a bend with a curvature extending over a transition region in the substrate. The tow is laid in at least a first section and a second section within the transition region. Each of the first and second sections has an angular orientation that is less than the curvature of the bend. The first section and the second section of the tow at least partially span the transition region. The bend has a bend angle, and each of the first and second sections of the tow may be curved and have an angle of curvature that is less than the bend angle. The shape of the tow approximates an ideal shape of the bend in the transition region. In one variation, each of the first and second sections of the tow is a substantially straight section. The method may further comprise programming a numeric controller, and using the controller to control an advanced fiber placement machine. Laying the tow is performed by the advanced fiber placement machine, and may include steering the tow in a first direction from a beginning point along the first section to an ending point along the first section, changing the direction of steering of the tow at the end of the ending point of the first section, and steering the tow in a second direction from the ending point of the first section to an ending point of the second section. The method may be employed to form a composite laminate structure, such as an aircraft spar.

According to another disclosed embodiment, a method is provided of placing prepreg tows on a substrate having a bend angle extending over a transition region. Each of the tows is placed on the substrate in a plurality of sections, wherein at least certain of the sections of each of the tows has an angular orientation that is less than the bend angle. At least one of the sections is a substantially straight section, and placing the tows may include steering the tow in a direction along the section from a beginning point of the section to an ending point of the section, and changing the direction of steering at each of the ending points. In one variation, the sections include at least two curved sections and a substantially straight section connecting the two curved sections. In another variation, each of the sections is curved while in a further variation, each of the sections is substantially straight.

According to a further disclosed embodiment, a method is provided of placing a prepreg tow on a substrate having a bend angle θ extending over a transition region. The method comprises dividing the bend angle θ into n individual sections, wherein each of the sections has an angle of curvature of approximately θ/n, and placing the tow on the substrate includes steering the tow along each of the sections.

According to still another disclosed embodiment, a method is provided of producing a one-piece composite structure having at least one transition region containing a bend angle. The method comprises forming a composite laminate layup by laying up prepreg tows on a substrate, including dividing the bend angle into multiple sections and steering the prepreg tows along each of the sections. Steering the prepreg tows along each of the sections includes steering the tows along angles that are each less than the bend angle. The steering may be performed using a numerically controlled, advanced fiber placement machine. The method may also include programming a numeric controller to automatically control the numerically controlled, advanced fiber placement machine, including programming the numeric controller to steer the prepreg tows within each of the sections of the bend angle, and curing the layup. The method may be employed to produce a composite laminate aircraft airframe member.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is an illustration of a perspective view of a composite laminate spar having a bend therein, produced according the disclosed method.

FIG. 2 is an illustration of a side view of the composite laminate spar shown in FIG. 1, showing a tow having a high angle transition region.

DETAILED DESCRIPTION

Figure 3:
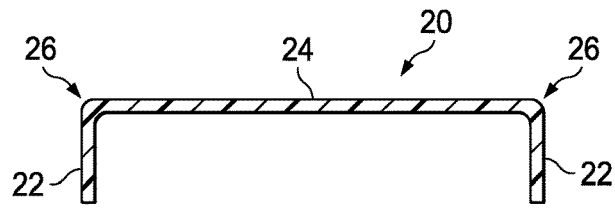
FIG. 3 is an illustration of a sectional view taken along the line 3-3 in FIG. 1.

The disclosed embodiments involve a method of fabricating composite laminate structures, such as composite laminate aircraft spars, that have high angle transition regions using automated placement of prepreg tows. As will be discussed below, the disclosed method helps reduce or eliminate gathering and wrinkling of the tows and/or stress concentrations in the structure.

FIGS. 1, 2, 3 and 5 illustrate a typical one-piece composite laminate structure 20 fabricated in accordance with the disclosed method. The composite laminate structure 20 is elongate and includes a pair of flanges 22 integrally formed with a web 24. The flanges 22 have a height "H" and transition into the web 24 along integral radiused corners 26. The composite laminate structure 20 includes two generally straight, elongate portions 30 connected by a curved transition region 28, sometimes also referred to below as a "high angle transition region" 28 or "transition region" 28. As used herein, "high angle transition region", and "transition region" refer to a region of the composite laminate structure 20 having one or more curves, contours or changes in angles or other geometry feature or details along which it may be difficult to steer and place one or more of the tows 32, or in which the tow 32 may be subject to gathering, wrinkling, buckling and/or fiber distortion. The illustrated composite structure 20 may be, for example and without limitation, a spar or a stringer forming part of an airframe 90 (FIG. 13), but is merely illustrative of a wide range of one-piece composite laminate structures having one or more transitions regions 28 that may be fabricated using the disclosed method.

Figure 4:
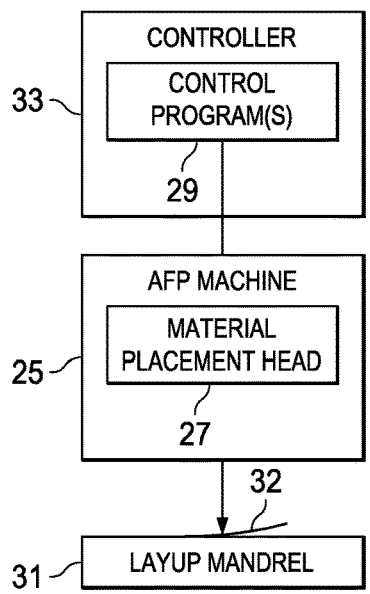
FIG. 4 is an illustration of a block diagram of a system for fabricating a composite laminate structure having a high angle transition region.

Referring to FIG. 4, the composite laminate structure 20 may be laid up on a substrate such as a layup mandrel 31, using a numerically controlled advanced fiber placement (AFP) machine 25 operated by a controller 33 having one or control programs 29 containing program instructions (not shown). The AFP machine 25 may include a material placement head 27 that steers, places and compacts a bandwidth of prepreg tows 32 onto the layup mandrel 31, or onto a substrate defined by underlying layers or plies formed by the tows 32. Steering the prepreg tows 32 as they are placed is controlled by the controller 33 using control programs 29 that are suitable for the application.

Figure 5:
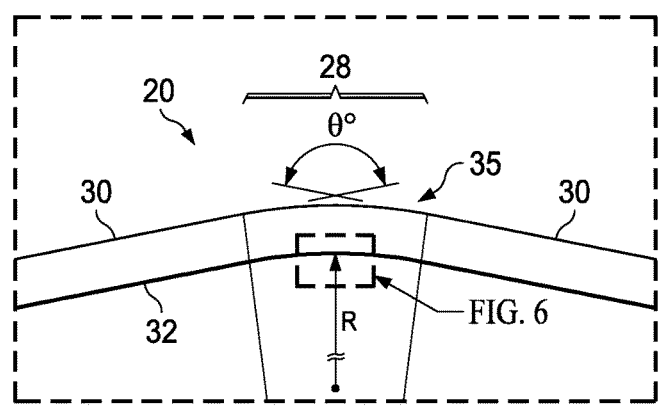
FIG. 5 is an illustration of the area designated as "FIG. 5" in FIG. 3.
Figure 6:
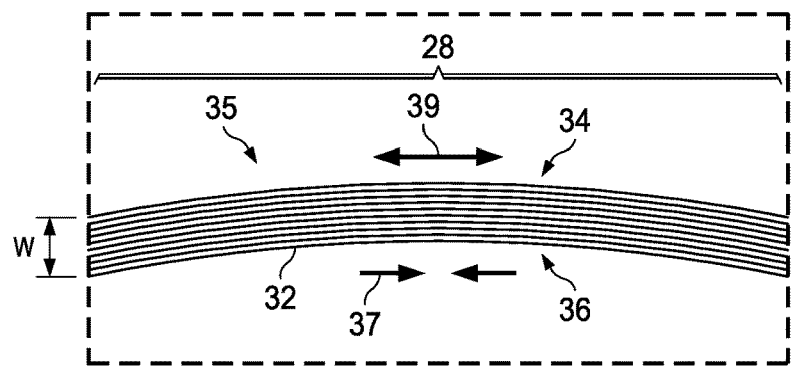
FIG. 6 is an illustration of the area designated as "FIG. 6" in FIG. 5.

FIGS. 5 and 6 illustrate a desired, ideal geometry of one typical tow 32 that has been steered around a bend 34 within the transition region 28 and placed on one of the flanges 22. The bend 35 is connected to and is continuous with the straight portions 30 of the tow 32. The straight portions 30 form a bend angle θ relative to each other. In the illustrated application, the bend 35 has a substantially constant radius of curvature R, however in other applications, the radius of curvature R of the bend 35 may or may not be constant. In other words, the bend 35 may or may not have a constant curvature. Where the bend 35 has a constant radius of curvature R, such as in the example illustrated in FIG. 5, the transition region 28 may be considered as comprising the arc length of the bend 35, or the length of the tow 32 over which the bend angle θ extends.

Referring particularly to FIG. 6, due to the curvature of the bend 35, the inside radius 36 of the tow 32 is in compression 37, while the outside radius 34 of the tow 32 is in tension. In accordance with the disclosed method discussed below, the tow 32 is steered and placed in a manner that reduces the inside radius compression 39 to the point that possible gathering, wrinkling, buckling and/or distortion of the tow 32 within the transition region 28 is reduced or eliminated.

Figure 7:
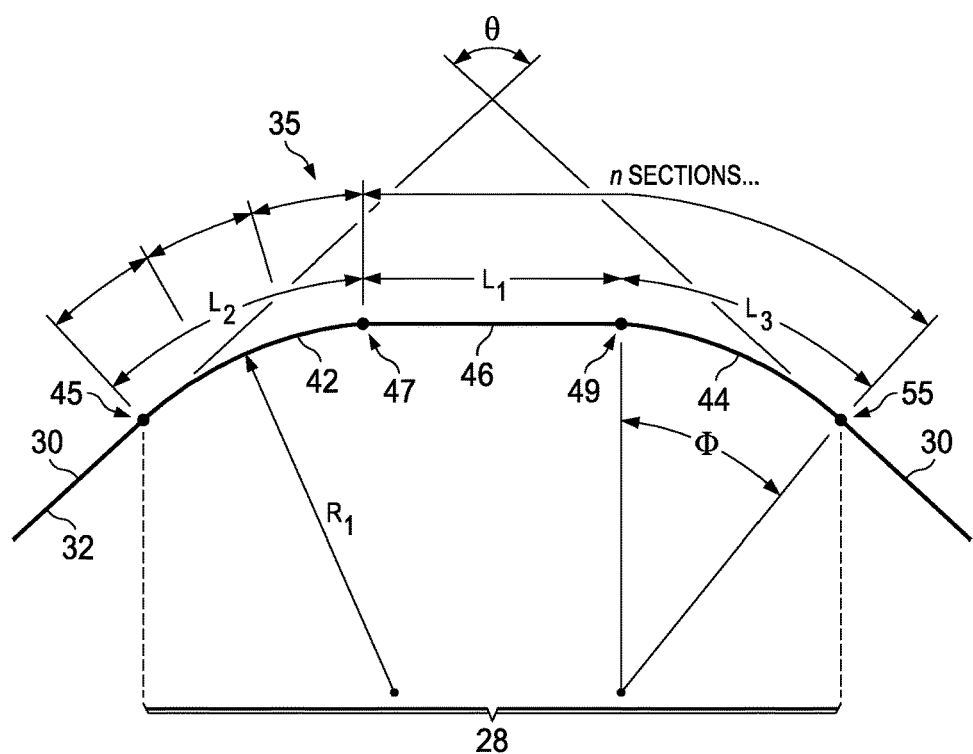
FIG. 7 is an illustration of a diagram of a single tow placed in a high angle transition region according to one disclosed embodiment of a tow placement method.

Referring to FIG. 7, in one embodiment, the disclosed method broadly comprises laying the tow 32 in a plurality of sections, for example, sections 42, 44, 46, around a bend 35 in the transition region 28. Each of the sections 42, 44, 46 has an angular orientation that is less than the bend angle θ. The sections 42, 44, 46 may at least partially span, or may fully span the transition region 28. In the embodiment shown in FIG. 7, sections 42, 44 are curved and have angular orientations or angles of curvatures φ that are less than the curvature of the bend 35, while section 46 is a straight section that has an angular orientation that is less than the bend angle θ. In effect, the bend angle θ is broken-up into multiple sections, for example sections 42, 44, 46 (FIG. 7) which together, form an approximation of the desired bend 35. More particularly, the bend angle θ is broken-up into n individual sections that may be either straight or curved, where n is a number that is two or more. The n number of sections may or may not be connected by or include one or more straight sections 46, and together, may span the entire transition region 28.

In another embodiment, the method comprises laying the tow 32 in at least a first section and a second section within the transition region 28, where each of the first and second sections has an angular orientation that is less than the curvature of the bend 35. In one variation discussed below, each of the first and second sections is a curved section 58 (FIG. 9) and has an angle of curvature φ that is less than the bend angle θ. In another embodiment discussed below, each of the first and second sections is a substantially straight section 50 (FIG. 10) having an angular orientation that is less than the bend angle θ. In still other embodiments, the tow 32 may be laid within the transition region in any combination of straight sections 50 and curved sections 58, each having an angular orientation that is less than the bend angle θ. As will be discussed below in more detail, the use of one or more straight sections 46 may be unnecessary where the bend angle θ is broken into many relatively short, gently curved bend sections. In one embodiment, the bend angle θ may be divided into n individual sections 42, 44, wherein each of the sections 42, 44 has an angle of curvature φ of approximately θ/n. Although placed in n individual sections, each of the tows 32 is continuous throughout the bend 35.

For example, FIG. 7 illustrates a bend 35 in a continuous tow 32 placed within a transition region 28 between two substantially straight portions 30 of the tow 32. The bend 35 in the tow 32 is formed by steering the prepreg tow 32 in a direction along two curved sections 42, 44 and a substantially straight section 46 extending between the two curved sections 42, 44. Each of the two curved sections 42, 44 may or may not have a constant radius of curvature $R_1$ and each has an angle of curvature φ that is less in magnitude than the bend angle θ. The radius of curvature $R_1$ and the angle of curvature φ of the two curved sections 42, 46 may be substantially identical, or may be different from each other.

As shown in FIG. 7, the sections 42, 44, 46 of the continuous tow 32 respectively have lengths $L_1$, $L_2$, $L_3$ that may vary, depending on the application and the geometry of the bend 35. When placing the continuous tow 32 within the high angle transition region 28, the tow 32 is steered in a curved path from a beginning point 45 at the end of one of the straight portions 30, along one of the curved sections 42 to an ending point 47, and then in a substantially straight line from the ending point 47 along the straight section 46 to the beginning point 49 of the second curved section 44. The tow 32 is then steered in a curved path from the beginning point 49 to the ending point 55 of the curved section 44. In an embodiment where the tow 32 is placed by an AFP machine 25 (FIG. 4), the beginning and ending points, e.g. 45, 47, 49, 55 represent a change in direction of the material placement head 27.

In the example shown in FIG. 7, the bend 35 in the tow 32 within the transition region 28 is formed by breaking the transition region 28 into three sections 42, 44, 46, however, it may be possible to form the bend 35 in as few as two sections of the tow 32, for example, into a single curved section 42 and single straight section 46. By using curved sections 42 that have an angle of curvature φ less than the bend angle θ, the amount of compression 37 (FIG. 6) on the inside radius of the tow 32 within the transition is reduced, thereby reducing possible gathering of the tow and related wrinkling and/or fiber distortion. Similarly, the use of one or more curved sections 42 in combination with one or more straight sections 46 within the transition region 28 likewise reduces possible wrinkling and/or fiber distortion because each of the straight sections 46 provides an opportunity for the tow 32 to "relax" by reducing compressive forces that may build up in the tow 32 due to having been steered along the curved sections 42, 44.

Figure 8:
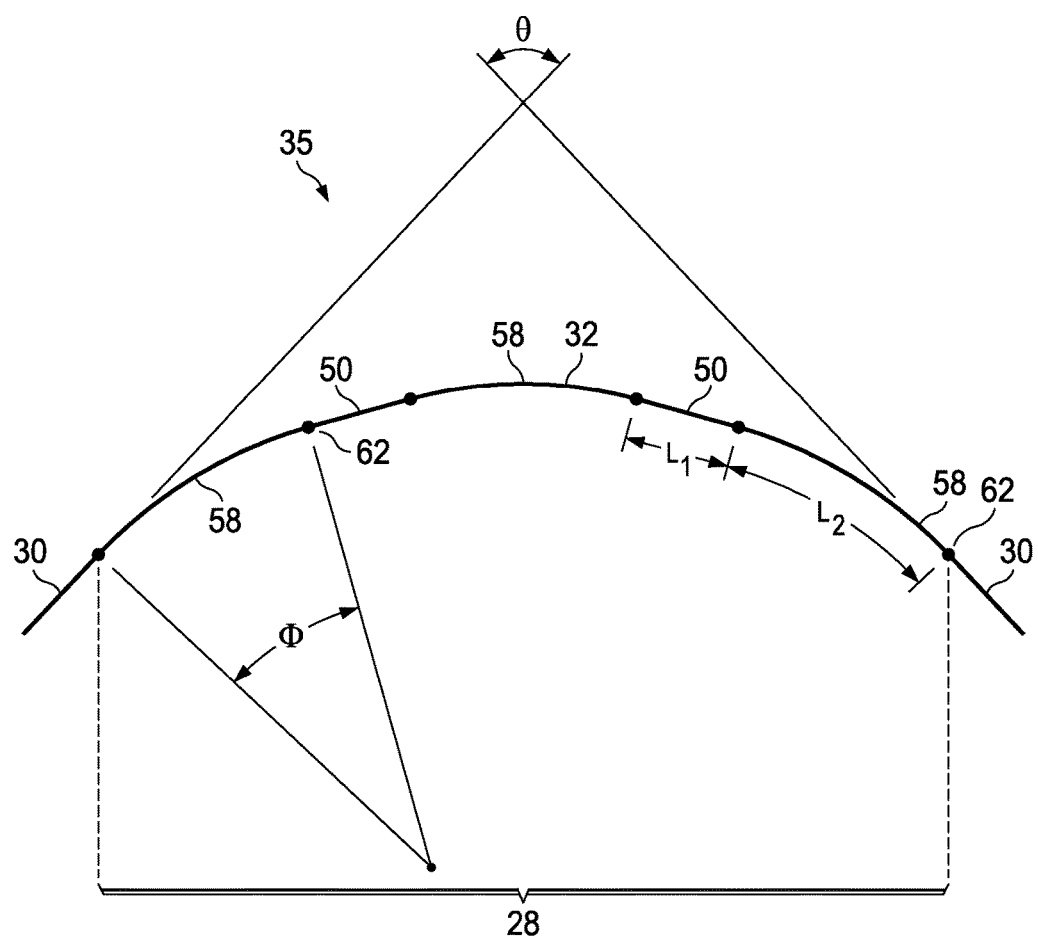
FIG. 8 is an illustration of a diagram of a single tow placed in a high angle transition region according to another disclosed embodiment of a tow placement method.

FIG. 8 illustrates a bend 35 within a high angle transition region 28, wherein the tow 32 is alternately steered between a plurality of curved sections 58 and a plurality of straight sections 50 between the curved sections 58. The points at which tow steering is altered between a straight path (i.e. straight sections 50) and curved paths (i.e. curved sections 58) are indicated at 62. The length $L_1$ of the straight sections 50 and the length $L_2$ of the curved sections 58 will depend upon the particular application, including the bend angle θ.

Some or all of the lengths $L_1$ may be equal or unequal to each other. Similarly, some or all of the lengths $L_2$ may be equal or unequal to each other. As in previous examples, each of the curved sections 58 has an angle of curvature $\phi$ that is less than the bend angle $\theta$.

Figure 9:
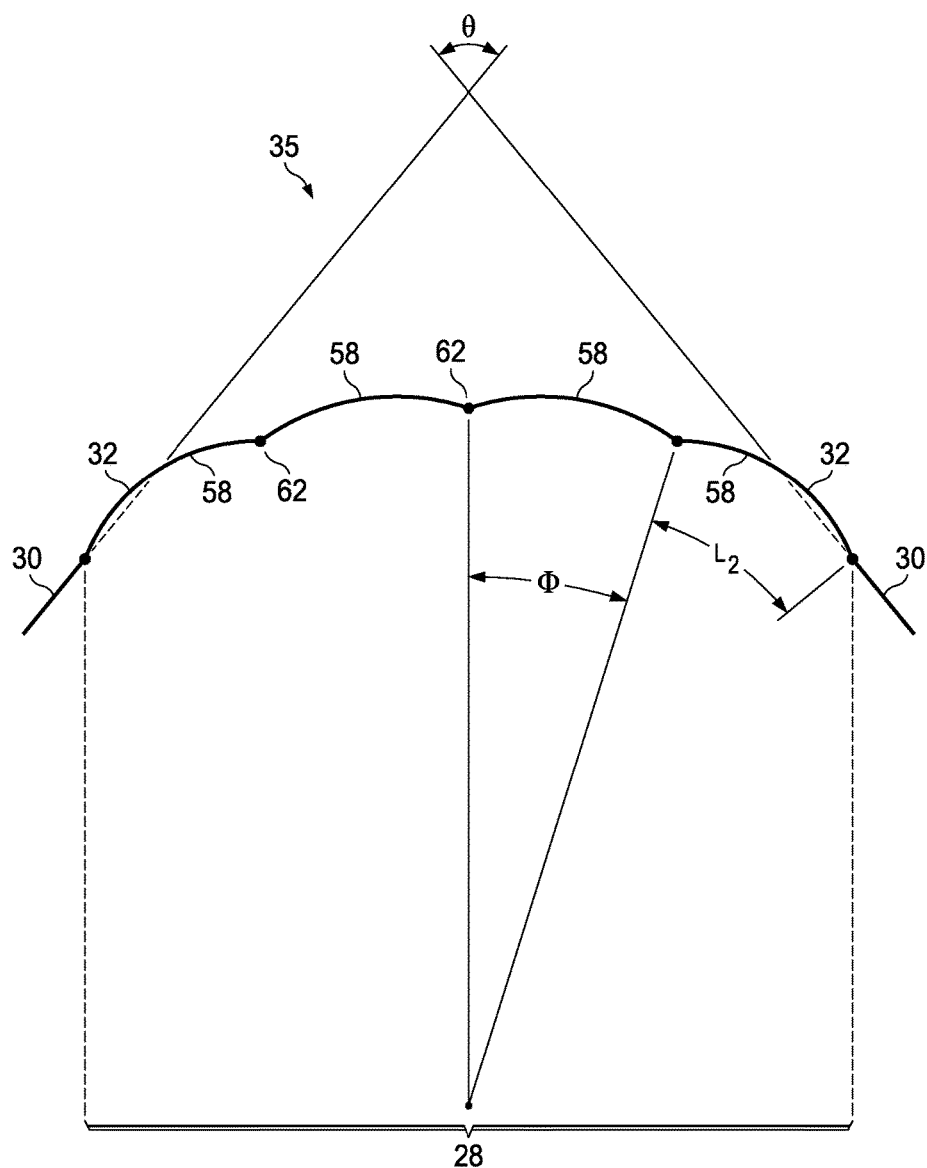
FIG. 9 is an illustration of a diagram of a single tow placed in a high angle transition region according to a further disclosed embodiment of a tow placement method.

Referring now to FIG. 9, it may be possible to place the tow 32 around the bend 35 within the high angle transition region 28 by steering the tow 32 along a plurality of successive curved sections 58 each of which has an angle $\phi$ that is less than the bend angle $\theta$. The angles $\phi$ of curvature of the curved sections 58, as well as the lengths $L_2$ of the curved sections 58, may be the same or different from each other.

Figure 10:
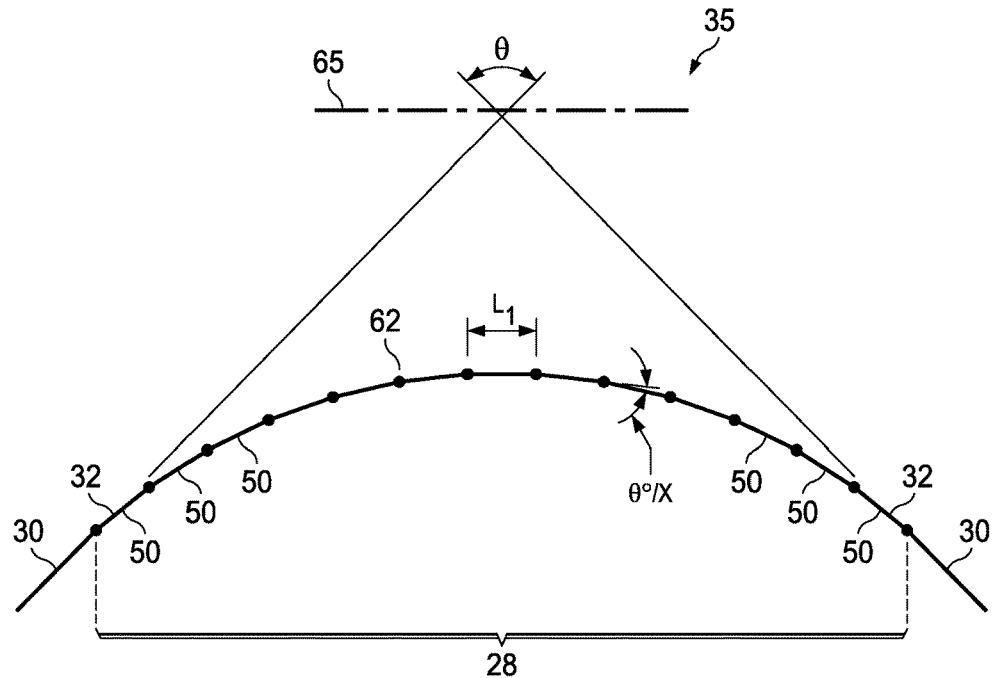
FIG. 10 is an illustration of a diagram of a single tow placed in a high angle transition region according to a still another disclosed embodiment of a tow placement method.

FIG. 10 illustrates a further example of a tow 32 that has been steered around a bend 35 within the transition region 28 in a plurality of sections 50 in order to reduce or eliminate tow wrinkling and/or distortion. In this embodiment, each of the sections 50 is a straight section 50 and has a length $L_1$. The lengths $L_1$ of the straight sections 50 may be the same or may be different from each other in magnitude. Each of the straight sections 50 has an angular orientation $\phi$ relative to a reference axis 65 that is less than the bend angle $\theta$. The number of sections 50 will vary with the application, but generally, use of a greater number sections 50 results in a closer approximation of a desired curvature of the tow 32 to form the bend 35.

Figure 11:
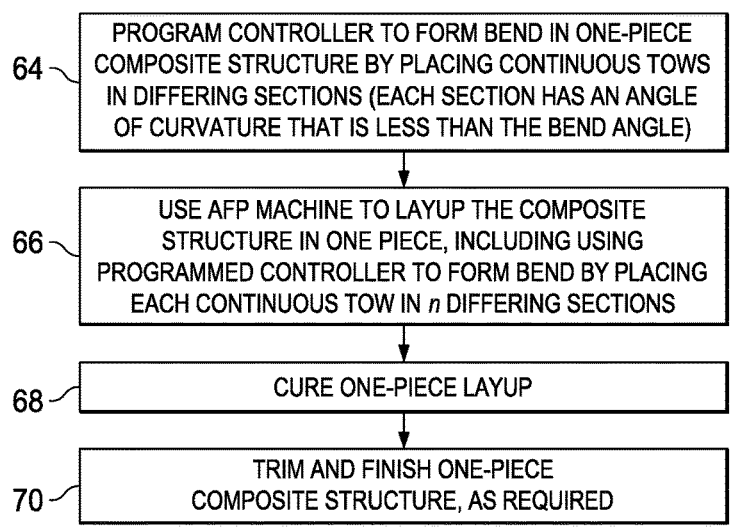
FIG. 11 is an illustration of a flow diagram of a method of making a one-piece composite structure having a high angle transition region.

Attention is now directed to FIG. 11 which broadly illustrates the overall steps of a method of fabricating a one-piece composite structure 20 having a bend 35 in a high angle transition region 28 thereof, using automated placement of prepreg tows 32. The method may begin at step 64 with programming a numeric controller 33 to form the bend 35 in a one-piece composite structure 20 by placing each tow 32 in differing sections 42, 44, 46 within the transition region 28, wherein each of the sections 42, 44, 46 has an angle of curvature $\phi$ that is less in magnitude than angle $\theta$ of the bend. Although placed in differing sections 42, 44, 46, each of the tows 32 is continuous throughout the transition region 28. Programming the numeric controller includes programming the numeric controller 33 to steer the continuous prepreg tows within each of the sections of the bend angle $\theta$. At step 66, a numerically controlled, advanced fiber placement machine 25 operated by the controller 33 is used to layup the composite structure 20. Step 66 includes using the controller 33 to form the bend 35 by placing each tow 32 in n differing sections within the transition region 28. At 68, the one-piece composite laminate layup 20 is cured, and at 70, the cured, one-piece composite structure 20 may be trimmed and finished, as required.

Figure 12:
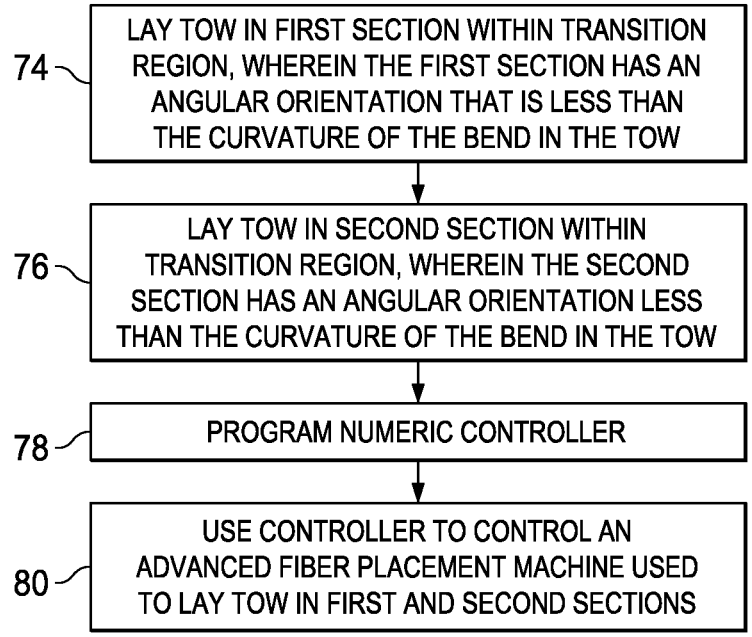
FIG. 12 is an illustration of a flow diagram of a method of placing a prepreg tow on a substrate having a bend with a curvature extending over a transition region in the substrate.
Figure 13:
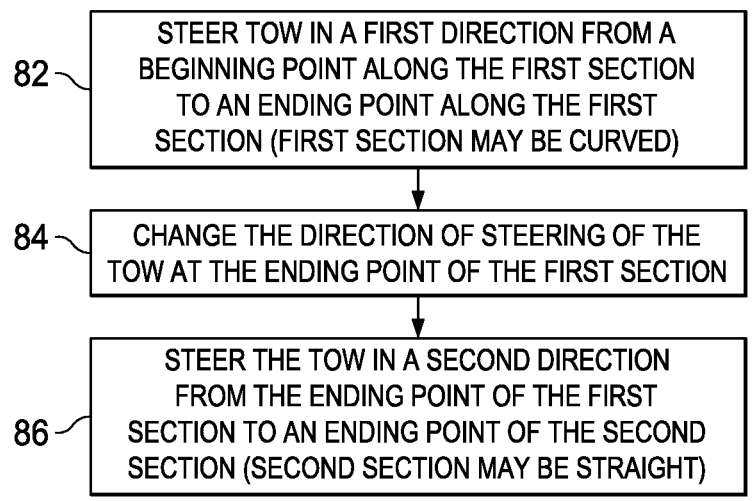
FIG. 13 is an illustration of a flow diagram showing how a tow is steered in the method shown in FIG. 12.

FIG. 12 illustrates a method of placing a prepreg tow on a substrate having a bend with a curvature extending over a transition region in the substrate. At 74, the tow is laid in a first section within the transition region, wherein the first section has an angular orientation that is less than the curvature of the bend in the tow. At 76, the tow is laid in a second section within the transition region, wherein the second section has an angular orientation that is less than the curvature of the bend in the tow. At 78, a numeric controller is programmed, and at 80, the numeric controller is used to control an advanced fiber placement machine which is employed to lay the tow in the first and second sections. FIG. 13 illustrates a method of carrying out steps 74 and 76 in which the tow is laid in sections. As shown in step 82, the tow is steered in a first direction from a beginning point along the first section to an ending point along the first section. In some embodiments, the first section may be curved. At step 84, the direction of steering of the tow is changed at the ending point of the first section. At step 86, the tow is steered in a second direction from the ending point of the first section to an ending point of the second section. In some embodiments, the second section may be straight.

Figure 14:
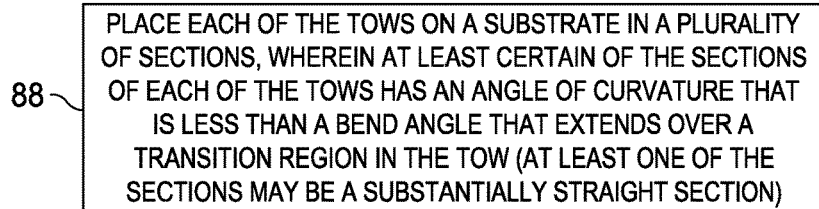
FIG. 14 is an illustration of a flow diagram of a method of placing prepreg tows on a substrate having a bend angle extending over a transition region.

Attention is now directed to FIG. 14 which illustrates a method of placing prepreg tows on a substrate having a bend angle extending over a transition region. As shown at 88, the method comprises placing each of the tows on the substrate in a plurality of sections, wherein at least certain of the sections of each of the tows has an angle of curvature that is less than the bend angle.

Figure 15:
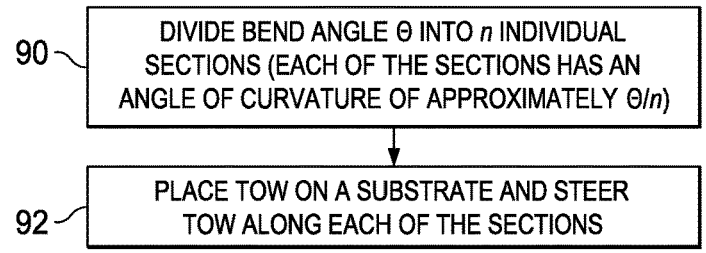
FIG. 15 is an illustration of a flow diagram of a method of placing a prepreg tow on a substrate having a bend angle extending over a transition region.

FIG. 15 illustrates a method of placing a prepreg tow on a substrate having a bend angle $\theta$ extending over a transition region. At 90, the bend angle $\theta$ is divided into n individual sections, wherein each of the sections has an angle of curvature of approximately $\theta$/n. At step 92, the tow is placed on the substrate and is steered along each of the sections.

Figure 16:
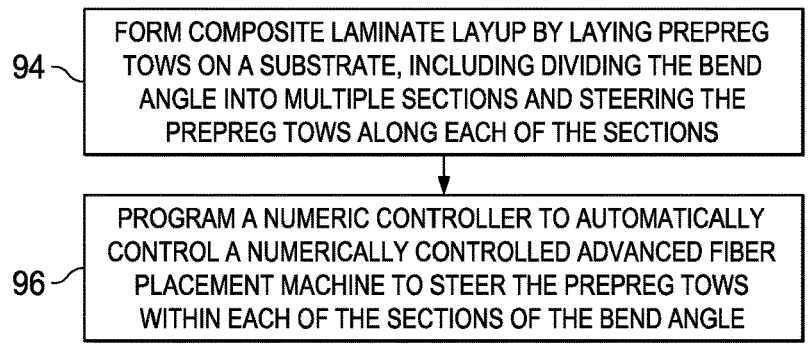
FIG. 16 is an illustration of a flow diagram of a method of producing a one-piece composite structure having at least one transition region containing a bend angle.

Attention is now directed to FIG. 16 which illustrates the steps of a method of producing a one-piece composite structure having at least one transition region containing a bend angle. The method comprises, at step 94, forming a composite laminate layup by laying prepreg tows on a substrate, including dividing the bend angle into multiple sections and steering the prepreg tows along each of the sections. At step 96, a numeric controller may be programmed to automatically control a numerically controlled advanced fiber placement machine to steer the prepreg tows within each of the sections of the bend angle.

Figure 17:
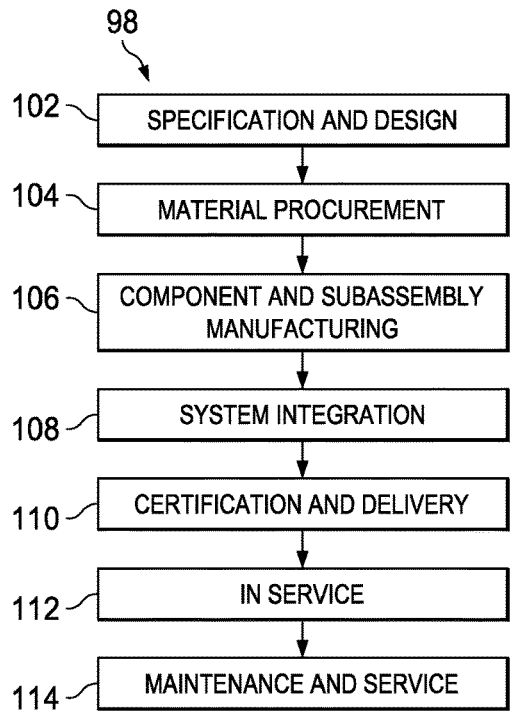
FIG. 17 is an illustration of a flow diagram of aircraft production and service methodology.
Figure 18:
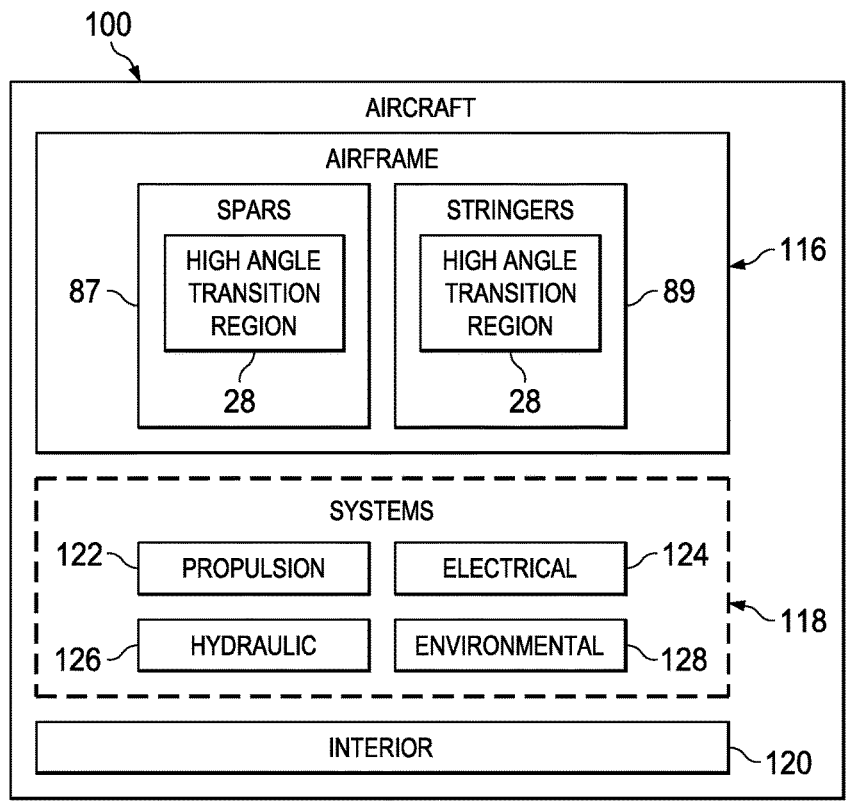
FIG. 18 is an illustration of a block diagram of an aircraft.

Embodiments of the disclosure may find use in a variety of potential applications, particularly in the transportation industry, including for example, aerospace, marine, automotive applications and other application where one-piece curved or contoured composite structural members, such as spars, stringers and similar stiffeners, may be used. These structural members may have one or more high angle transition regions. Thus, referring now to FIGS. 17 and 18, embodiments of the disclosure may be used in the context of an aircraft manufacturing and service method 98 as shown in FIG. 17 and an aircraft 100 as shown in FIG. 18. Aircraft applications of the disclosed embodiments may include, for example, without limitation, various components of an airframe 116 (FIG. 18) such as spars 87 and stringers 89 having high angle transition regions 28. During pre-production, exemplary method 98 may include specification and design 102 of the aircraft 100 and material procurement 104. During production, component and subassembly manufacturing 106 and system integration 108 of the aircraft 100 takes place. Thereafter, the aircraft 100 may go through certification and delivery 110 in order to be placed in service 112. While in service by a customer, the aircraft 100 is scheduled for routine maintenance and service 114, which may also include modification, reconfiguration, refurbishment, and so on. One-piece, curved or contoured composite laminate structures may be used as replacement components during the routine maintenance and service 114 of the aircraft 100.

Each of the processes of method 98 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers, and an operator may be an airline, leasing company, military entity, service organization, and so on.

As shown in FIG. 18, the aircraft 100 produced by exemplary method 98 may include an airframe 116 with a plurality of systems 118 and an interior 120. As noted previously, the airframe 116 may include spars 87, stringers 89 or a variety of other contoured, one-piece structural members fabricated according to the disclosed method described above. One or more of the spars 87 and/or the stringers 89 may have one or more high angle transition regions 28. Examples of high-level systems 118 include one or more of a propulsion system 122, an electrical system 124, a hydraulic system 126 and an environmental system 128. Any number of other systems may be included. Although an aerospace example is shown, the principles of the disclosure may be applied to other industries, such as the marine and automotive industries.

Systems and methods embodied herein may be employed during any one or more of the stages of the production and service method 98. For example, components or subassemblies corresponding to production process 106 may be fabricated or manufactured in a manner similar to components or subassemblies produced while the aircraft 100 is in service. Also, one or more apparatus embodiments, method embodiments, or a combination thereof may be utilized during the production stages 106 and 108, for example, by substantially expediting assembly of or reducing the cost of an aircraft 100. Similarly, one or more of apparatus embodiments, method embodiments, or a combination thereof may be utilized to fabricate one-piece, contoured composite structures having high angle transition regions 28 used in the maintenance and service 88 of the aircraft 100.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of placing a prepreg tow on a substrate having a bend with a curvature extending over a transition region in the substrate, wherein the bend subtends a first angle defined between a first imaginary line having a first endpoint at a first side of the transition region and a second imaginary line having a second endpoint at a second side of the transition region, wherein a vertex of the first imaginary line and the second imaginary line is located at a point on a reference axis that is perpendicular to an apex of the bend, and wherein the point corresponds to about mid-way along a distance extending along the transition region between the first endpoint and the second endpoint, the method comprising:

laying the prepreg tow with at least a first section of the prepreg tow and a second section of the prepreg tow within the transition region, wherein the first section extends along a first portion of the transition region and has a first degree of curvature that is less than the first angle, and wherein the second section extends along a second portion of the transition region and has a second degree of curvature that is less than the first angle;

programming a numeric controller; and using the numeric controller to control an advanced fiber placement machine, wherein laying the prepreg tow is performed by the advanced fiber placement machine.

2. The method of claim 1, wherein the first section and the second section of the prepreg tow at least partially span the transition region.

3. The method of claim 1, wherein laying is performed as a single laying operation with a single length of prepreg tow.

4. The method of claim 1, wherein the prepreg tow has a shape that approximates a shape of the bend in the transition region.

5. The method of claim 1, wherein at least one of the first and second sections of the prepreg tow is substantially straight, and another of the first and second sections of the prepreg tow is curved.

6. The method of claim 1, wherein laying the prepreg tow includes:

steering the prepreg tow in a first direction from a beginning point along the first section to an ending point along the first section, changing steering of the prepreg tow from the first direction to a second direction at the ending point of the first section, steering the prepreg tow in the second direction from the ending point of the first section to an ending point of the second section.

7. The method of claim 1, wherein each of the first and second sections is a substantially straight section.

8. A method of placing prepreg tows on a substrate having a transition region that subtends a bend angle in the substrate, comprising:

placing each of the prepreg tows on the substrate in a plurality of sections all defined along corresponding lengths of the transition region, wherein at least certain of the plurality of sections of each of the prepreg tows has corresponding degrees of curvatures that are all less than the bend angle, wherein placing each of the prepreg tows on the substrate includes:

steering the tow in a direction along a section in the at least certain of the plurality of sections from a beginning point of the section to an ending point of the section, and changing the direction of steering at the ending point.

9. The method of claim 8, wherein at least one of the plurality of sections is a substantially straight section.

10. The method of claim 8, wherein the plurality of sections include at least two curved sections and a substantially straight section connecting the two curved sections.

11. The method of claim 8, wherein each of the plurality of sections is curved.

12. The method of claim 8, wherein each of the plurality of sections is substantially straight.

13. A method of producing a one-piece composite structure having at least one transition region that subtends a bend angle in the one-piece composite structure, comprising:

forming a composite laminate layup by laying up prepreg tows on a substrate, including dividing the bend angle into multiple sections and steering the prepreg tows along each individual section such that, within each of the multiple sections, corresponding degrees of curvatures along the multiple sections are all less than the bend angle, wherein steering the prepreg tows is performed using a numerically controlled, advanced fiber placement machine.

14. The method of claim 13, wherein steering the prepreg tows along each of the multiple sections includes steering the tows along angles that are each less than the bend angle.

15. The method of claim 13, further comprising:
programming a numeric controller to automatically control the numerically controlled, advanced fiber placement machine, including programming the numeric controller to steer the prepreg tows within each of the multiple sections of the bend angle.

* * * * *